US005491788A

United States Patent [19]
Cepulis et al.

[11] Patent Number: 5,491,788
[45] Date of Patent: Feb. 13, 1996

[54] METHOD OF BOOTING A MULTIPROCESSOR COMPUTER WHERE EXECUTION IS TRANSFERRING FROM A FIRST PROCESSOR TO A SECOND PROCESSOR BASED ON THE FIRST PROCESSOR HAVING HAD A CRITICAL ERROR

[75] Inventors: Darren J. Cepulis, Houston; Louis R. Gagliardi, Tomball, both of Tex.

[73] Assignee: Compaq Computer Corp., Houston, Tex.

[21] Appl. No.: 119,424

[22] Filed: Sep. 10, 1993

[51] Int. Cl.$^6$ .................................................... G06F 11/00
[52] U.S. Cl. ................... 395/182.11; 395/182.21; G06F/11/00
[58] Field of Search ............................ 395/575, 182.11, 395/182.21, 182.22; 371/11.3, 16.1, 67.1, 68.3

[56] References Cited

U.S. PATENT DOCUMENTS

| | | | |
|---|---|---|---|
| 4,181,940 | 1/1980 | Underwood et al. | 364/200 |
| 4,634,110 | 1/1987 | Julich | 371/11.3 |
| 5,155,731 | 10/1992 | Yamaguchi | 371/16.5 |
| 5,247,659 | 9/1993 | Curran et al. | 395/575 |
| 5,408,647 | 4/1995 | Landry | 395/575 |
| 5,418,955 | 5/1995 | Ikeda et al. | 395/700 |

*Primary Examiner*—Hoa T. Nguyen
*Attorney, Agent, or Firm*—Pravel, Hewitt, Kimball & Krieger

[57] ABSTRACT

A multiprocessor computer system handles the failure of one or more of its processors without totally disabling the system. On power up, all of the CPUs are deactivated except for a CPU in a first physical slot. The power on self test routines review a log of errors and determine if certain critical errors have previously occurred. If so, the CPU in the first physical slot halts operation entirely. If the CPU in the first physical slot is not functioning properly or is halted, the hardware then awakens a CPU in a second physical slot, designates it as the first logical CPU, and the CPU then performs similar diagnostic checks. If it fails, the hardware again tries a third physical CPU and so on. When one CPU passes the initial error review, it proceeds with initialization of the computer system and performs further self testing. If it functions properly, it is designated as the first logical CPU, and retains its designation until the power is cycled. This first logical CPU then awakens the remaining CPUs and boots the rest of the system. If it fails this later self testing by having certain critical errors occur, the logical CPU 0 designation is transferred to another active CPU and the old CPU is halted. The new CPU commences operation effectively where the old CPU halted, so that system initialization is continued not restarted. The power on self test routines then further test the CPU in the first physical slot. Thus, if at least one CPU is operational, the computer system boots and operates.

8 Claims, 13 Drawing Sheets

METHOD OF BOOTING A MULTIPROCESSOR COMPUTER WHERE EXECUTION IS TRANSFERRING FROM A FIRST PROCESSOR TO A SECOND PROCESSOR BASED ON THE FIRST PROCESSOR HAVING HAD A CRITICAL ERROR

BACKGROUND OF THE INVENTION

1. Field of the Invention

The invention relates to multiprocessor computer systems, and more particularly, to start-up logic for assigning logical central processing unit (CPU) designations among multiple CPUs, with the booting CPU being reassigned based on the existence of certain prior errors on that CPU.

2. Description of the Related Art

Advancements in computer technology proceed at a tremendous rate. Modern microprocessors operate at frequencies so high that processors only a few years old seem sluggish and lethargic in comparison. On the other hand, modern applications have become so complex and versatile that even the high performance delivered by modern systems is taxed to the limit. Consequently, the effort to develop yet more powerful and effective computer systems continues.

One well known method of improving computer performance is to provide multiple processors in a single system. Asymmetrical multiprocessor systems, in which one microprocessor is the master and another microprocessor performs specific functions as a slave of the master microprocessor, are common and well known. Although the master/slave relationship improves computer performance due to the division of tasks, the computer does not operate at maximum capability. This is because the slave processor performs only particularly designated operations, and thus remains idle when a task not designated for the slave processor is performed. While these operations are executed, the computer system is no more efficient than a single processor system.

The computer system's efficiency may be further enhanced by making the multiple processors symmetrical. In a symmetrical system, any processor can perform any required function. Thus, all microprocessors operate simultaneously, spending little or no idle time, and the computer system operates near its maximum efficiency. In addition, the system may be further improved by adding supplementary microprocessors as the workload increases. Adding microprocessors is particularly effective in file server systems having an array of independent functions to be performed simultaneously.

Although symmetrical multiprocessor systems are efficient, they are difficult to design. One of the many obstacles to overcome in designing a symmetrical multiprocessor system is the potential presence of a non-functional processor. A simple method of booting up a multiprocessor system is to power up one of the central processing units (CPUs), generally designated CPU0, and ignore the others. When the first CPU has booted up, the first CPU then turns on and tests the remaining CPUs and the various components of the system. If the first microprocessor does not function properly, however, it cannot turn on the remaining processors and the entire system is left incapacitated. Consequently, the computer owner or operator has a computer system with one or more operational CPUs, but ironically, the system is useless until the repairman arrives.

In addition, for many DOS based applications and for booting purposes, one of the CPUs must be designated as CPU0. CPU0 commonly performs various functions for the system, like DRAM refresh operations, which make CPU0 unique even in a symmetrical multiprocessor system. Thus, most multiprocessor systems require one of the microprocessors to be designated as CPU0. In many systems, a CPU residing in a particular physical location is always designated as CPU0. If one of the CPU locations is always designated as containing CPU0, however, the slot may be empty, or the CPU may fail, crippling the entire system.

One system, described in more detail below, addressed the problem of the CPU in the first physical slot failing by automatically rotating the CPU0 designation to the CPU in the next physical slot if the first CPU did not perform a selected operation within a given time period. This solved the problem of the total failure of the CPU, as it was marked bad and the CPU0 designation was rotated. However, it was not helpful in the cases of the more marginal failures, such as parity errors, which are relatively infrequent but are critical enough that the CPU cannot be considered dependable. The prior system would have simply continued until the CPU failed again, with a resulting loss of time and productivity and potential loss of information. Thus, it is desirable to have CPU0 rotation on causes other than total CPU failure.

SUMMARY OF THE PRESENT INVENTION

The present multiprocessor computer system includes power up logic for finding a fully functioning CPU to designate as CPU0, particularly a CPU which has not previously had certain severe or critical errors which limit system dependability. Each microprocessor has a physical location designation which remains constant. Because the CPU designated as CPU0 may not occupy physical location 0 in the computer, the designated CPU is referred to as logical CPU0, or CPU L0. When the system is powered up, all of the CPUs except the CPU in physical slot 0 (CPU P0) are initially placed in a SLEEP mode. The microprocessor in physical location 0 performs its power on self test (POST). An early part of this POST routine involves reviewing a log of errors and determining if a critical error has occurred. If so, the CPU halts operation. If there were no prior critical errors, the POST routine continues. Included in the POST routine are other tests of the CPU, both the processor itself and the associated cache memory system. If the CPU functions properly during all of these tests, the CPU is designated as CPU L0, and the CPU retains this designation until the system is power cycled. The CPU designated as CPU L0 then awakens the remaining CPUs and boots up the rest of the computer system.

If CPU P0 is not functioning properly and cannot perform even the most basic functions, it is designated as inoperative. The hardware system then awakens CPU P1 and repeats the process of testing the CPU. If CPU P1 is operational, then it is designated as CPU L0, and it boots the remainder of the system. On the other hand, if CPU P1 also fails, it is also given an inoperative designation. The computer system then turns on CPU P2, and repeats the process. The process repeats until an operational microprocessor is found to perform the CPU L0 functions. Consequently, if at least one of the microprocessors in the system is functioning, the computer system boots and operates.

If the early portion of the POST routine determines that there have been critical errors, then the halting of the CPU occurs sufficiently quickly that the rotation hardware performs as described. If, however, the errors are not determined until the later tests of the CPU in the POST routine, the next operational CPU is activated, the CPU L0 designation passed to that CPU and the original CPU is noted as failed and is halted. The new CPU commences operation at approximately the point where the original CPU halted, so that completed operations of the POST routine are not repeated.

Thus, the multiprocessor system is not crippled by the failure or probable failure of a single processor, based on either total failure or certain critical intermittent failures, enhancing the dependability of the computer system.

BRIEF DESCRIPTION OF THE DRAWINGS

A better understanding of the present invention can be obtained when the following detailed description of the preferred embodiment is considered in conjunction with the following drawings, in which:

FIG. 4 is a simplified flow chart of the power up sequence for finding an operational CPU and FIG. 5A, 5B, 6, 7, 8, 9, 10, 11, 12, 13, 14 and 15 are flowcharts illustrating transferring control of the computer system to an operational CPU based on the occurrence of critical errors.

DETAILED DESCRIPTION OF THE PREFERRED EMBODIMENT

Figure 1:
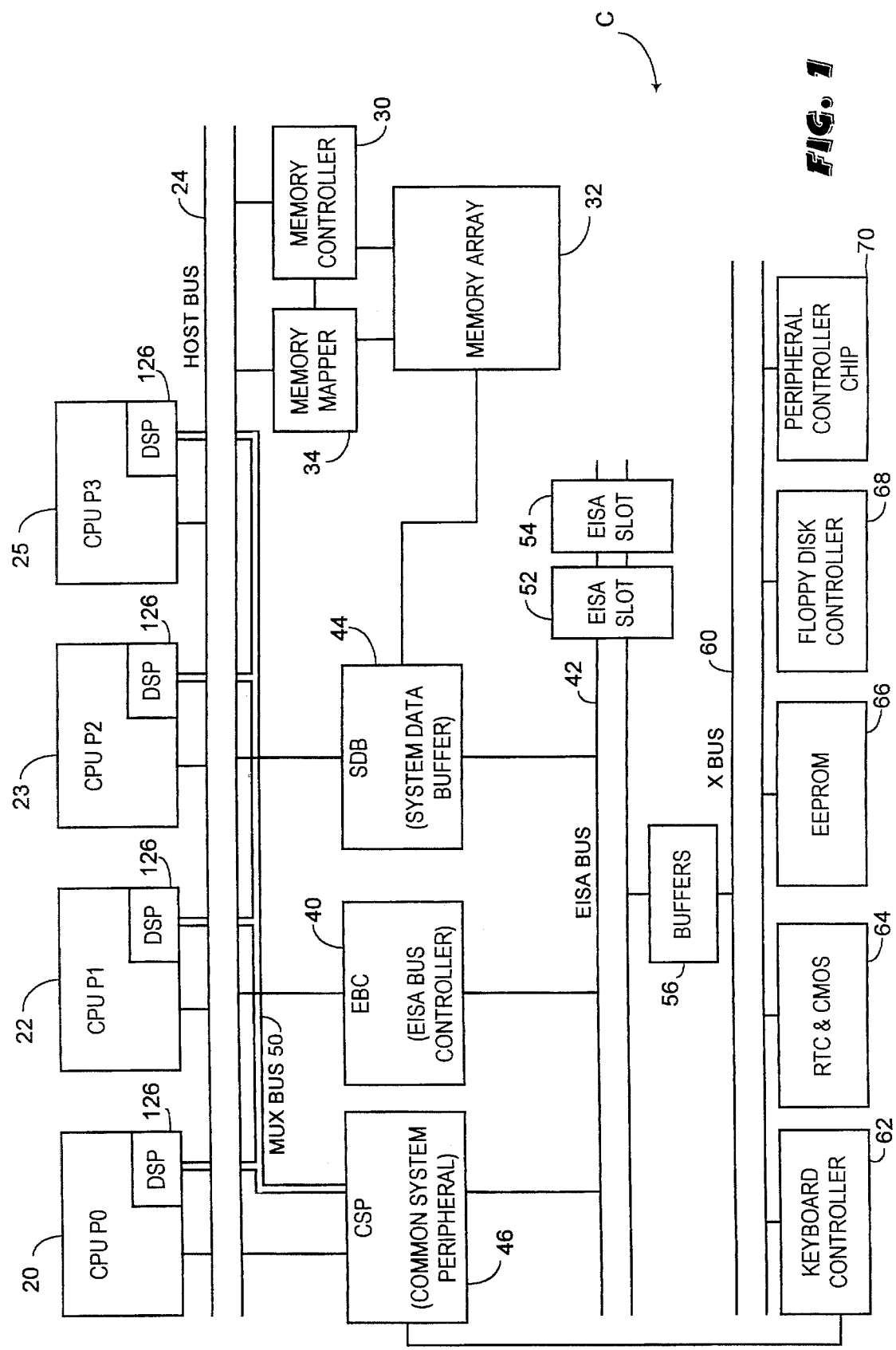
FIG. 1 is a block diagram of a computer system incorporating the present invention.

Referring now to FIG. 1, a computer system C is shown. The computer system C includes four CPU boards 20, 22, 23, 25 connected to a host bus 24 and a memory controller 30, which is also coupled to the host bus 24. Although four CPUs 20, 22, 23, 25 are used in the preferred computer system C, the present system functions for any multiprocessor system. Each CPU occupies a physical slot in the computer system by which the CPUs 20, 22, 23, 25 are designated. Thus, CPU P0 20 is the CPU that occupies physical slot 0 in the system. The CPUs are designated CPU P0 20, CPU P1 22, CPU P2 23, and CPU P3 25, in reference to each CPU's physical location.

A main memory array 32, preferably comprised of dynamic random access memory (DRAM) modules, is coupled to the memory controller 30. Memory mapper logic 34 is coupled to the host bus 24, the memory controller 30, and the memory array 32. The memory mapper logic 34 provides memory mapping functions to facilitate memory accesses to the memory array 32.

A bus controller 40, preferably an EISA bus controller (EBC), is coupled between the host bus 24 and an expansion bus 42, preferably an Extended Industry Standard Architecture (EISA) bus. The EBC 40 provides various bus cycle translation and conversion functions to facilitate transfers between the host bus 24 and the EISA bus 42. A system data buffer (SDB) 44 is also coupled between the host bus 24, the memory array 32 and the EISA bus 42. A logic block referred to as the common system peripheral (CSP) 46 is coupled between the host bus 24 and the EISA bus 42. The CSP 46 is also coupled through a MUX bus 50 to logic blocks referred to as distributed system peripherals (DSPs) 126 in each of the CPUs 20, 22, 23, 25. The CSP 46 includes various system components including a direct memory access (DMA) controller, an EISA arbitration controller, and numerous system board logic functions like memory refresh control and interrupt logic.

The EISA bus 42 includes a plurality of EISA slots 52 and 54 for receiving EISA expansion cards, like a network interface card or a hard disk interface card. The EISA bus 42 is coupled through buffers 56 to a bus referred to as the X bus 60. A number of peripheral devices are coupled to the X bus 60 including the keyboard controller 62, a real time clock (RTC) and CMOS memory 64, an electrically erasable programmable read only memory (EEPROM) 66 used to store the BIOS and system functions, a floppy disk controller 68, and a peripheral controller chip 70, which includes numerous ports and UARTs (universally asynchronous receiver/transmitters).

The MUX bus 50 between the CSP 46 and the various DSPs 126 associated with the CPUs 20, 22, 23, 25 includes an XAD bus. The XAD bus is an 8-bit bi-directional data bus on which interrupt, I/O, and special cycle data is transferred. The MUX bus 50 further includes a cycle status bus called the XST bus. This three-bit bus is controlled by the CSP 46 and defines the cycle currently being transferred on the 8-bit MUX bus 50. The MUX bus 50 further includes a two-bit XBP bus, which is an input bus on which DMA byte pointer information is received from the DSPs 126. Using the XAD, XST, and XBP buses, the CSP 46 interfaces with the DSPs 126 to provide interaction between the general computer system C and the CPUs 20, 22, 23, 25. The MUX bus 50 is a broadcast bus that transmits all signals to all of the CPUs 20, 22, 23, 25, and each CPU 20, 22, 23, 25 determines whether it is the CPU being accessed.

For more information on the operation of the MUX bus 50, please see related copending application Ser. No. 07/955,482 entitled MULTIPLEXED COMMUNICATION PROTOCOL BETWEEN CENTRAL AND DISTRIBUTED PERIPHERALS IN MULTIPROCESSOR COMPUTER SYSTEMS, filed on Oct. 2, 1992, which is hereby incorporated by reference. For more information regarding the CSP 46 and the DSPs 126, please see related copending application Ser. No. 07/955,683, entitled ARRANGEMENT OF DMA, INTERRUPT AND TIMER FUNCTIONS TO IMPLEMENT SYMMETRICAL PROCESSING IN A MULTIPROCESSOR COMPUTER SYSTEM, filed on Oct. 2, 1992, which is hereby incorporated by reference.

The CSP 46 provides an interface between the MUX bus 50 and the EISA bus 42 and X bus 60 of the computer system C. Various transfers and operations are defined on the MUX bus 50 using the XST bus to define the transfer and the XAD bus to identify addresses, data, and interrupts. The CSP 46 implements a MUX bus master interface to assert interrupts and transfer data to and from the DSPs 126. The CSP 46 in the present system also includes power up timer logic. When the system is powered up, a power up timer begins counting. If CPU 20 in physical location zero does not write to a particular DSP port accessed via the CSP 46 within a specific interval, which is two seconds in the preferred embodiment, the CSP 46 asserts a power up timeout (PUTO) signal to all of the DSPs 126. The PUTO signal is generated as a miscellaneous data transfer on the MUX bus 50. As described below, the PUTO signal causes the current CPU to be designated as inoperative and initiates testing of the next CPU.

Figure 2:
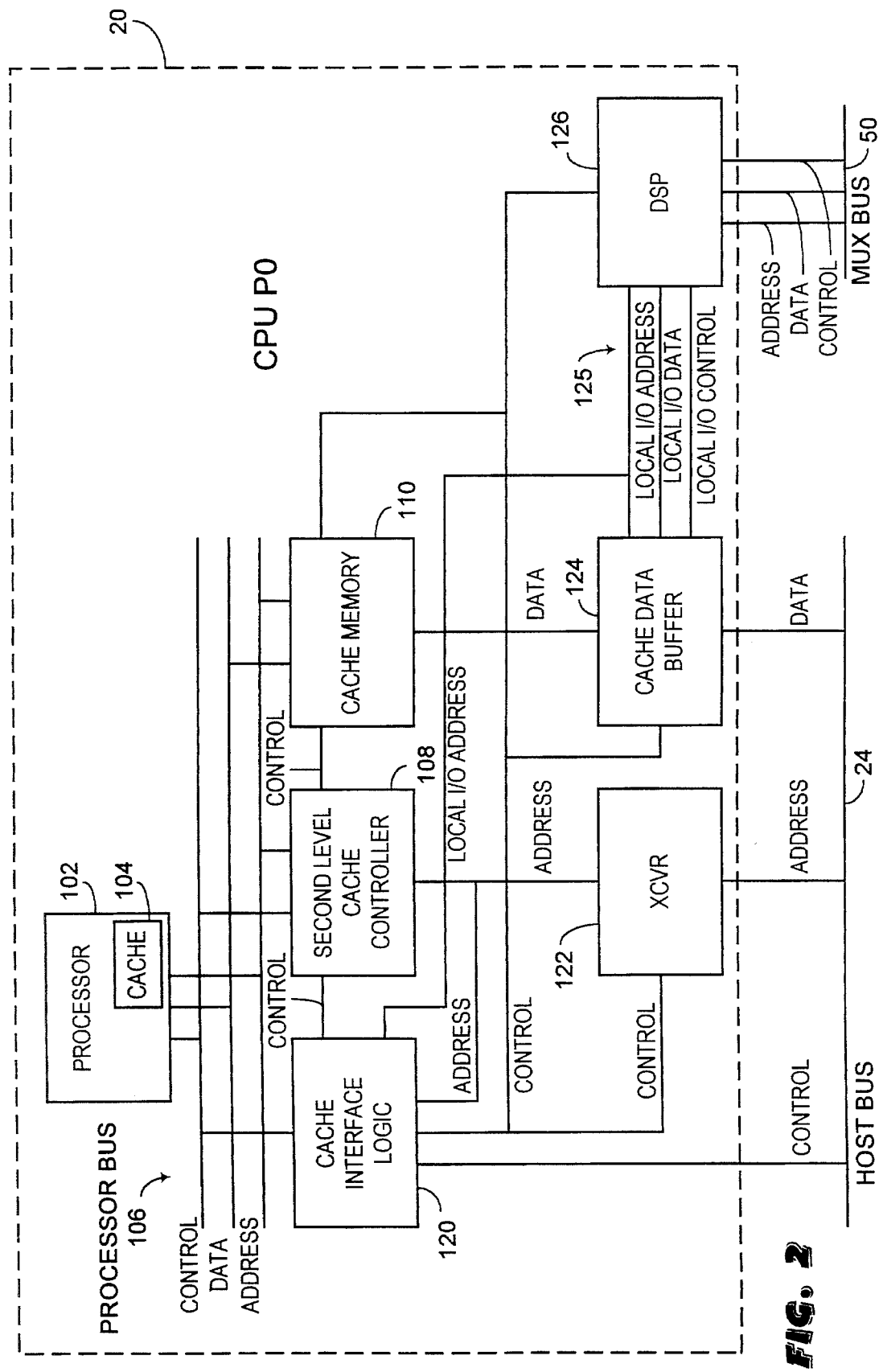
FIG. 2 is a block diagram of the CPU board of FIG. 1.

Referring now to FIG. 2, a block diagram of CPU P0 20 is shown. For the purposes of this application, all of the CPUs 20, 22, 23, 25 are substantially identical. In the following description, CPU P0 20 is described for simplicity, and the following description applies equally well to the other CPUs 22, 23, 25. CPU P0 20 includes a processor 102 which preferably includes an internal cache 104. The processor 102 is preferably the Intel i486 processor preferably running at 33/66 MHz or Pentium processor preferably running at 66 MHz. However, the use of other types of processors is also contemplated. The processor 102 is coupled to a processor bus 106 including control, data and address portions, as shown.

The CPU P0 20 further has a cache memory system which includes an array of cache RAMs 110, a cache controller 108, and various cache interface logic 120 and buffers 124 to interface between the processor bus 106 and the CPU components. In the preferred embodiment, the cache RAMs 110 are C8 or 82490 cache RAMs produced by Intel Corporation, and the cache controller 108 is a C5 or 82495 cache controller, also produced by Intel. The cache controller is also connected to an address transceiver 122 for transmitting addresses to and from the host bus 24. The transceiver 122 receives control signals from the cache interface logic 120.

Figure 3:
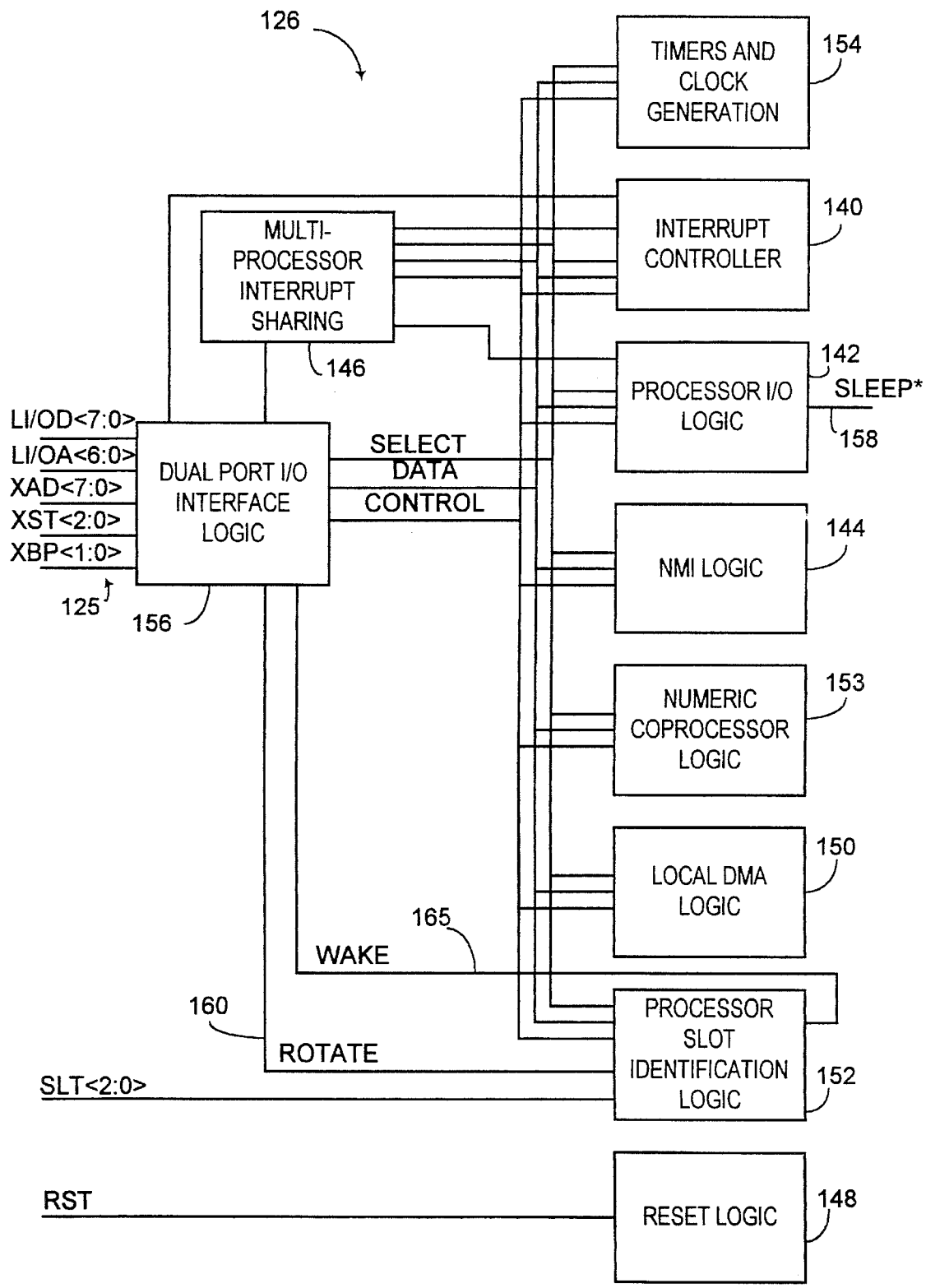
FIG. 3 is a more detailed block diagram of the distributed system peripheral (DSP) of FIG. 2.

The cache data buffer is linked not only to the host bus, but is also connected by a local I/O bus 125 to the DSP 126. The DSP 126 implements various logic functions that are closely related to the processor/cache system. Referring now to FIG. 3, the DSP 126 includes interrupt controller logic 140, preferably comprising two cascaded Intel 8259 interrupt controllers which provide 15 levels of interrupts. The DSP 126 also includes non-maskable interrupt (NMI) logic 144 and multiprocessor interrupt sharing logic 146. The multiprocessor interrupt sharing logic 146 allows a CPU to interrupt other CPUs at any interrupt level in one I/O access, thus providing an efficient multiprocessor communication capability. Also included are reset logic 148, DMA (direct memory access) logic 150, numeric coprocessor logic 153, timer clock generation logic 154, and dual port I/O interface logic 156. The dual port I/O interface logic 156 interfaces the various registers and logic in the DSP 126 with the local I/O bus 125 and the MUX bus 50.

CPU processor I/O logic 142 on the DSP includes a processor control port, and processor slot identification logic 152 includes a CPU Identification (WHOAMI) port, an Index CPU port, and a Logical CPU Assignment (LCA) port. The processor control port controls miscellaneous processor functions, like cache enabling and flushing and processor interrupt signals. In particular, the processor control port enables and disables the SLEEP, signal 158 to the microprocessor 102. When the system is power cycled, the SLEEP* signal 158 is disabled until the processor control port is written and the SLEEP, signal 158 is enabled. Any device, including the microprocessor 102 itself, may write to a CPU's processor control port to change the sleep bit in the port, which causes the SLEEP* signal 158 to be driven low by the DSP 126. The SLEEP* signal 158 is asserted low as long as the value of the sleep bit in the processor control port remains 1.

The SLEEP* signal 158 is provided to the cache interface logic 120. In the preferred embodiment, the SLEEP* signal 158 causes a hold request to be asserted to the microprocessor 102. When the hold request is acknowledged, the internal 486 first level cache 104 and the external second level C5 cache 110 are flushed. After the flush is completed, the hold request signal remains asserted so that the microprocessor 102 stays inactive. The hold request signal is maintained as long as the SLEEP* signal 158 is asserted. Thus, to activate the microprocessor 102, the processor control port of the DSP 126 is again written to disable the sleep state, which causes the SLEEP* and the microprocessor hold request signals to be negated, and the microprocessor 102 resumes operation.

Processor slot identification logic 152 consists of the logic required for physical CPU identification and logical CPU assignment. The logical CPU assignment is an arbitrary designation of a particular CPU, and each CPU may be addressed by its physical location or logical assignment using the MUX bus 50. One of the ports in the processor slot identification logic 152 is the Index CPU port, which is used to select the physical CPU to access when the LCA port is accessed, or to select the logical CPU to access when other local ports are accessed from the EISA bus. Local ports can be accessed directly or via an Index Address port in the CSP. The Index CPU port must be written before being used to assure its contents. If the indicated CPU matches the assignment indicated by the DSP's 126 WHOAMI port, the CPU performs the local operation. Otherwise, the operation from the MUX bus 50 is ignored.

Each DSP 126 includes a Logical CPU Assignment (LCA) port. The LCA port is used by the software, as discussed below, to assign logical CPU designations to physical CPU locations. It is also used to determine the physical location of a logical CPU. Each CPU's LCA port is accessible to all elements of the system C, but is not locally accessible but is accessible only over the EISA bus 42 through the CSP 46. The port contains CPU assignment bits used to assign the logical CPU number to the physical CPU location. The LCA port works in conjunction with the Index CPU port to access a particular physical CPU. Before the LCA port is written, the Index CPU port must be written with the desired CPU's physical location. When the LCA port is written on the next operation, the CPU having the indicated physical designation, instead of logical assignment, is accessed.

The WHOAMI port stores the logical CPU designation for the CPU and may only be read via the local bus 125. When accessed, the WHOAMI port responds with a number indicating the individual CPU's logical designation. The CPU's logical designation is determined when the system C is powered up, as discussed below. When the system C is power cycled, the WHOAMI port initially receives a value corresponding to the CPU's physical location. By accessing this port, each CPU determines its own logical CPU assignment, and therefore determines whether it is the particular CPU being addressed on the MUX bus 50.

Each CPU also receives a separate set of three SLT signals 161. The SLT signals 161 are permanently connected to particular signals to correspond to individual slots. For example, the SLT signals 161 for physical CPU slot 0 always assert 000, while those for slots 1 and 2 always assert 001 and 010, respectively. The SLT signals 161 are provided to the processor slot identification logic 152 on the DSP 126 so that each CPU may determine its physical slot location.

The processor slot identification logic 152 further receives a ROTATE signal 160 generated by the dual port I/O interface logic 156. The interface logic 156 asserts the ROTATE signal 160 when the PUTO signal is asserted on the MUX bus 50. When the ROTATE signal 160 is asserted, the processor slot identification logic 152 decrements the CPU's logical assignment in the WHOAMI port. If the CPU's logical CPU assignment is 0 when the ROTATE signal is asserted, the WHOAMI port value is set to FFh, indicating a non-functioning CPU. If the CPU's logical assignment is FFh when the ROTATE signal 160 is asserted, the ROTATE signal is ignored.

If the CPU's logical assignment rotates to 0, the processor slot identification logic 152 asserts a WAKE signal 165 to the interface logic 120. The WAKE signal 165 causes the interface logic 120 to change the processor control port's sleep bit in the processor I/O logic 142. As a result, the SLEEP* signal 158 is negated, and the CPU begins operation.

Figure 4:
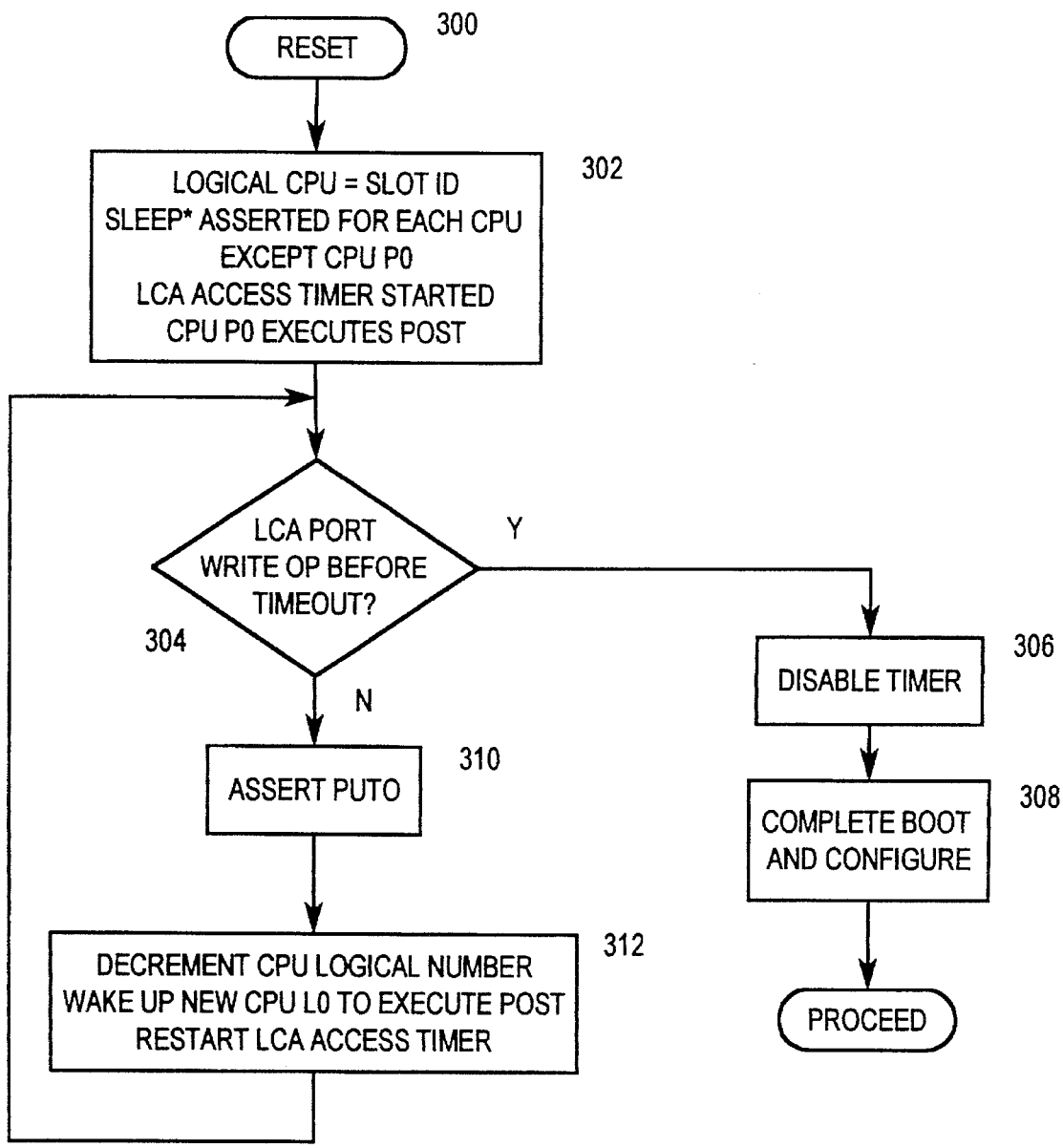

Referring now to FIG. 4, the logical configuration of the CPUs is established after the computer system is power cycled. When the system is powered up, the computer system C resets in step 300 and, in step 302, the DSP inputs the SLT signals to the WHOAMI port, so that each CPU receives an initial logical designation corresponding to its physical location. At the same time, each DSP asserts the SLEEP* signal on its CPU except for CPU P0, which remains awake and begins its power-on self test (POST) routine. In an alternative embodiment, the DSP for CPU P0 20 may also enable its sleep bit, but CPU P0 20 is then immediately awakened. When the SLEEP* signal is asserted for each CPU, all of the CPUs 22, 23, 25, except for CPU P0 20, become inactive. Meanwhile, the power up timer in the CSP 46 loads a preset interval on reset and begins counting when the reset signal is negated. In the preferred embodiment, the preset interval is approximately 2 seconds. The power up timer counts until it is disabled or times out.

The timer may be disabled by a write operation to the LCA port. In step 304, the CSP 46 determines whether a write operation to the LCA port has occurred before the timer times out. If CPU P0 20 is operating properly, the POST program directs the CPU P0 20 to execute a write operation to the LCA port. The write operation to the LCA port is detected by the CSP 46, which disables the timer in step 306.

Next, in step 308, the operational CPU, now designated CPU L0, completes its POST program and boots up the rest of the system C using standard boot software. In particular, CPU L0 wakes up and boots the remaining CPUs 22, 23, 25, with each CPU executing software to test itself and to assign an appropriate logical CPU designation. This process can conveniently be done by placing a special vector, which is interrogated early in the POST program, to special wake up code, which includes a handshake to CPU L0, so that each CPU can be brought up individually and indicate its status. A more detailed description is provided below. For more details on the basic operation of the startup and handshake procedure, please refer to application Ser. No. 07/431,743, originally entitled "COMMON RESET ROM", filed on Nov. 3, 1989, and continued as Ser. No. 08/051,601, filed on Apr. 22, 1993 and retitled "METHOD AND APPARATUS FOR RESETTING MULTIPLE PROCESSORS USING A COMMON ROM" which is hereby incorporated by reference. If one of the CPUs 22, 23, 25 is not functional as indicated by a failure to handshake within a given time, it is so designated in its DSP and the next consecutive functioning CPU is designated with the next logical CPU assignment. If the slot is empty, the logical CPU assignment sequence continues at the next slot occupied by an operational CPU. In addition to booting up the other CPUs, the designated CPU L0 boots up the rest of the computer system C, and operates as CPU L0 for all unique CPU L0 functions. As noted, this sequence is described in more detail below, particularly when intermittent critical errors have occurred on the first CPU.

If the write operation to the LCA port does not occur before the timer times out, the CSP 46 generates the PUTO signal in step 310 and it is transferred onto the MUX bus 50. When the PUTO signal is received by the DSPs 126, each DSP asserts the ROTATE signal 160 in step 312 and the logical assignment in the WHOAMI port of each CPU is decremented by 1. The current CPU L0 that failed to write the LCA port within the timer interval is assigned a value in its DSP 126 of FFh, indicating that the CPU is inoperative. A CPU having a logical assignment of FFh does not have its slot identification decremented when the power up timeout signal is asserted.

After the logical CPU assignments have been rotated, the new CPU L0 is awakened by the WAKE signal and begins the same POST code described before, which includes the write to the LCA port. The power up timer is restarted, and the process returns to step 304. The procedure repeats until an operational CPU writes to the LCA port before the timer times out and boots the rest of the system. If none of the CPUs are operational, the system will not boot up.

Figure 5A:
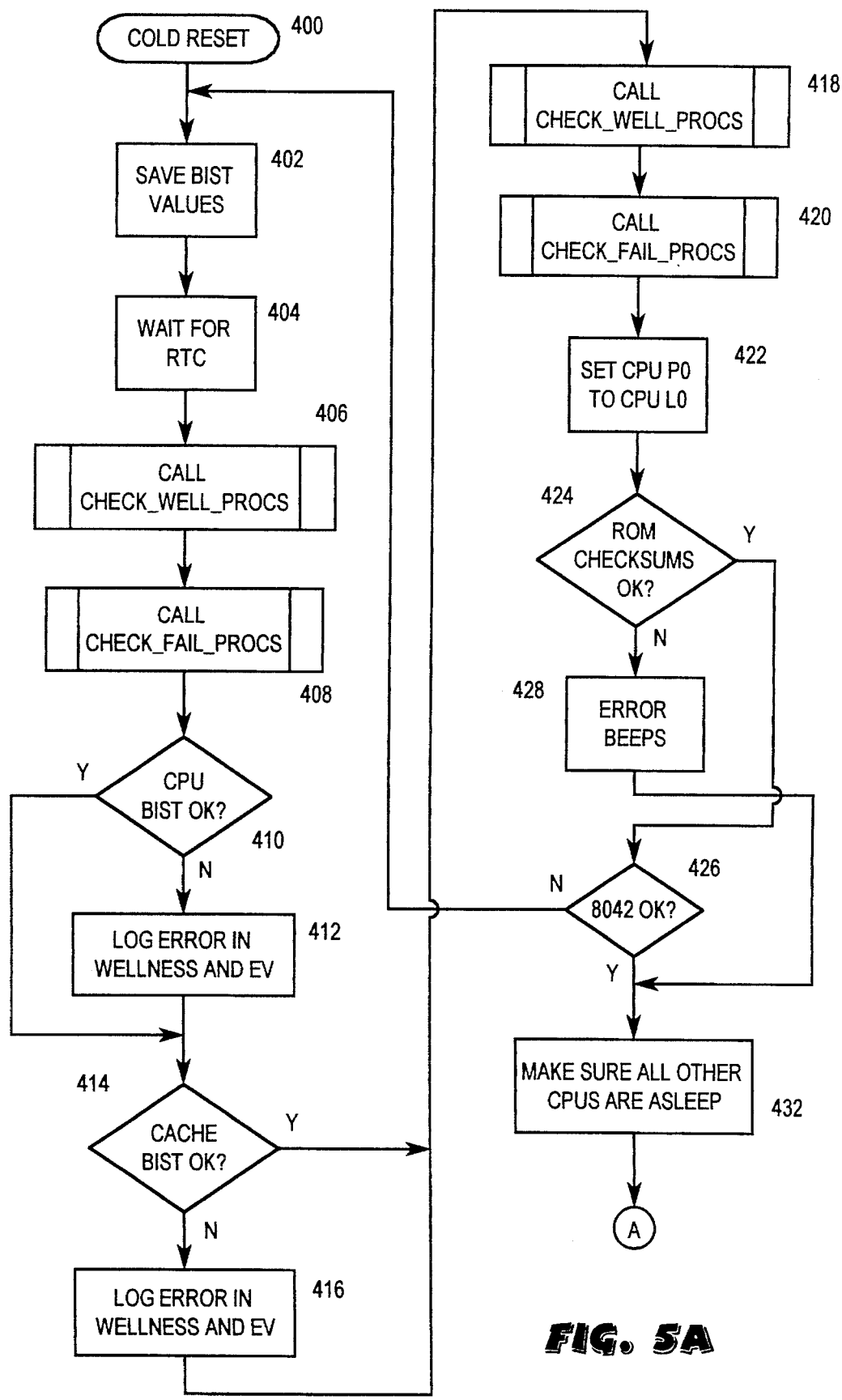
Figure 6:
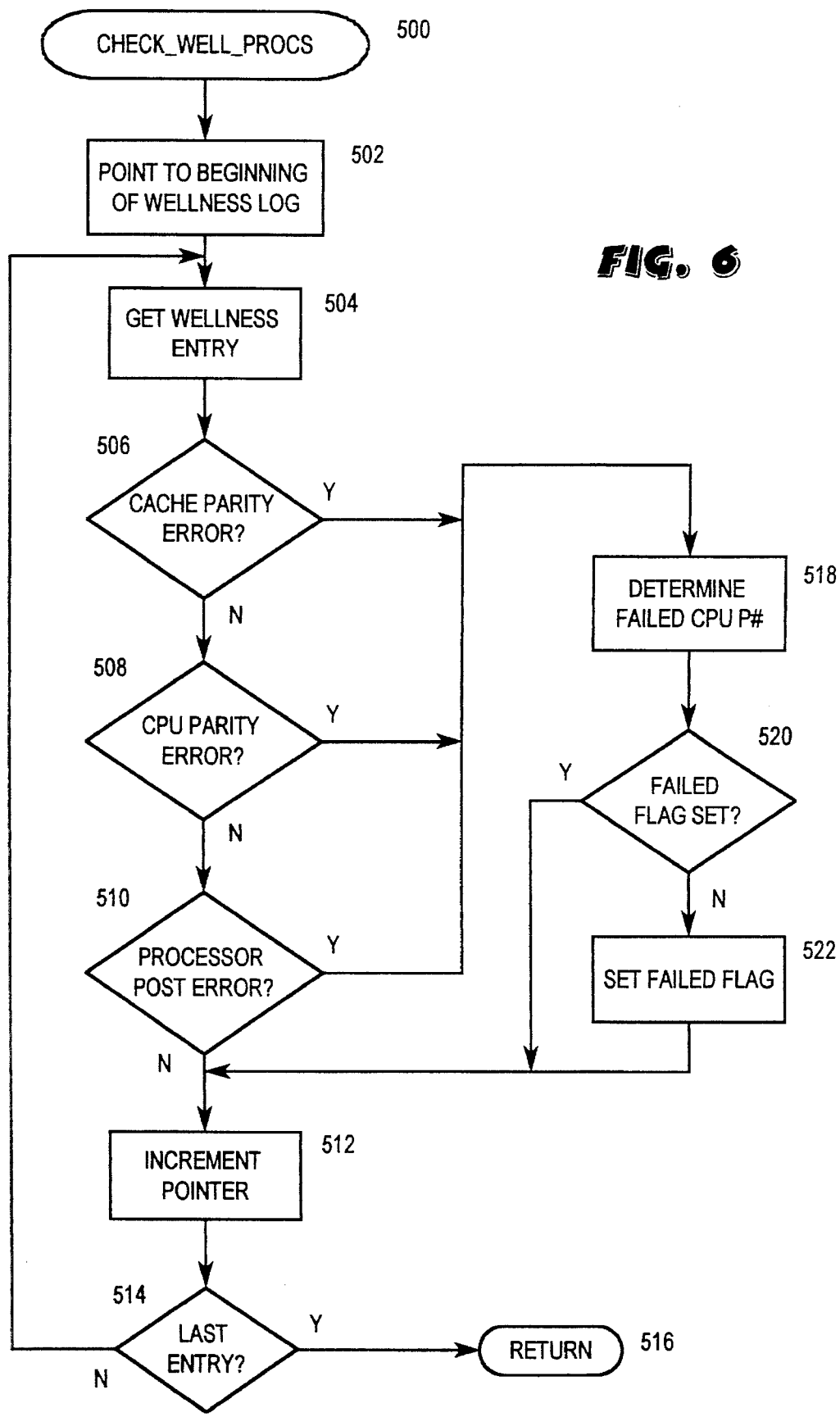
Figures 7, 8:
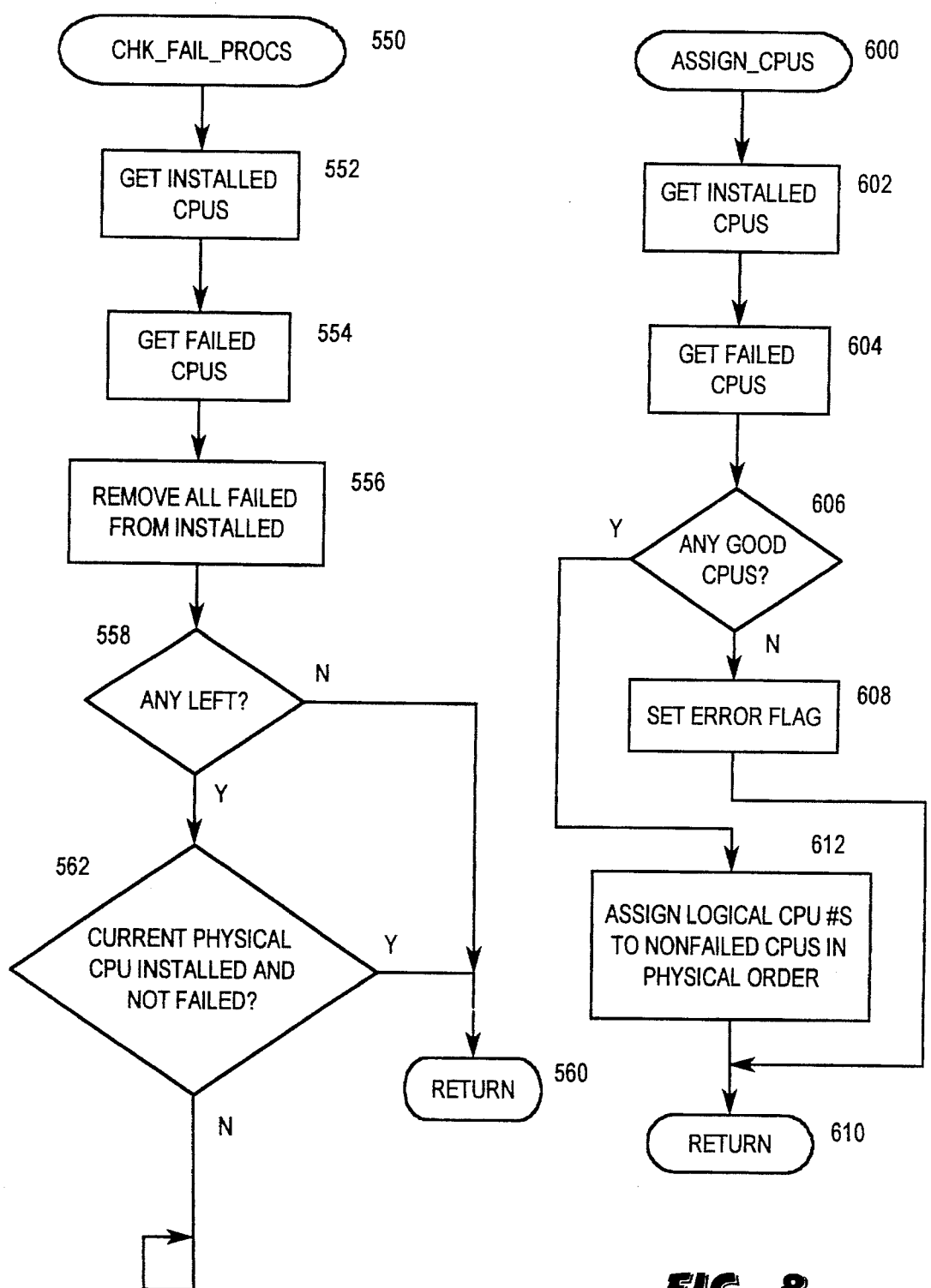

Referring now to FIG. 5A, a more detailed version of the RESET sequence is shown. In this case the COLD RESET sequence 400 commences at step 402 where the BIST or basic internal self test value provided by the processor of CPU P0 20 is stored for later examination. Control proceeds to step 404 which is a wait period until the RTC 64 becomes fully active. Control then proceeds to step 406, which is a call to the CHECK_WELL_PROCS sequence 500 (FIG. 6) to determine and update the failed flags. Preferably a series of flag bytes is maintained in the CMOS portion of the RTC 64 to store certain variables. One byte is used to indicate which processors are present, another to indicate which have failed. Control then proceeds to step 408, which is a call to the CHK_FAIL_PROCS sequence 550 (FIG. 7) which actually checks to see if any failed processors are present and if the current processor is a failed processor. Assuming that the current processor is not a failed processor, control proceeds to step 410 to determine if the CPU BIST value as stored in step 402 indicates that there are no problems. If there are problems, control proceeds to step 412 where the specific error is indicated, is logged in the wellness log and in environment variables. The wellness log is a running log contained preferably in the extended CMOS are contained in the RTC 64 or in another nonvolatile RAM source in the computer system C which keeps track of all of the errors which have occurred in the computer system C.

In most cases during run time operations, these errors generate an NMI or nonmaskable interrupt, with the NMI sequence then logging the error in the wellness log so that a maintenance record can be maintained. The environment variables are also areas in the extended CMOS area and which are used to set flags and pass information as to the state of the computer or for configuration values. In this case the error is just logged in an environment variable that indicates an error has occurred. The wellness log is used for more complete information. For more details, please refer to Ser. No. 07/955,849, entitled "COMPUTER FAILURE RECOVERY AND ALERT SYSTEM", filed on Oct. 2, 1992 and hereby incorporated by reference.

Control proceeds to step 414 after step 412 or if the CPU was okay in step 410. In step 414 the cache controller system 104 present on the CPU is checked to determine if its basic internal self test value was okay. If not, control proceeds to step 416 where the error is logged in the wellness log and in the environment variable. If it was okay in step 414 or after 416, control proceeds to step 418 where the CHECK_WELL_PROCS sequence 500 is again called. This call is to reupdate the failed status based on the errors which may have been determined in steps 410 and 414. Control then proceeds to step 420, where the CHK_FAIL_PROCS sequence 550 is called to shutdown a processor if necessary.

Control proceeds to step 422 where physical CPU0 is set to indicate to be a logical CPU0. This is done by a write operation to the LCA port as described above. This operation will have the effect of disabling the timer so that automatic, hardware-based CPU L0 rotation does not occur.

Figure 5B:
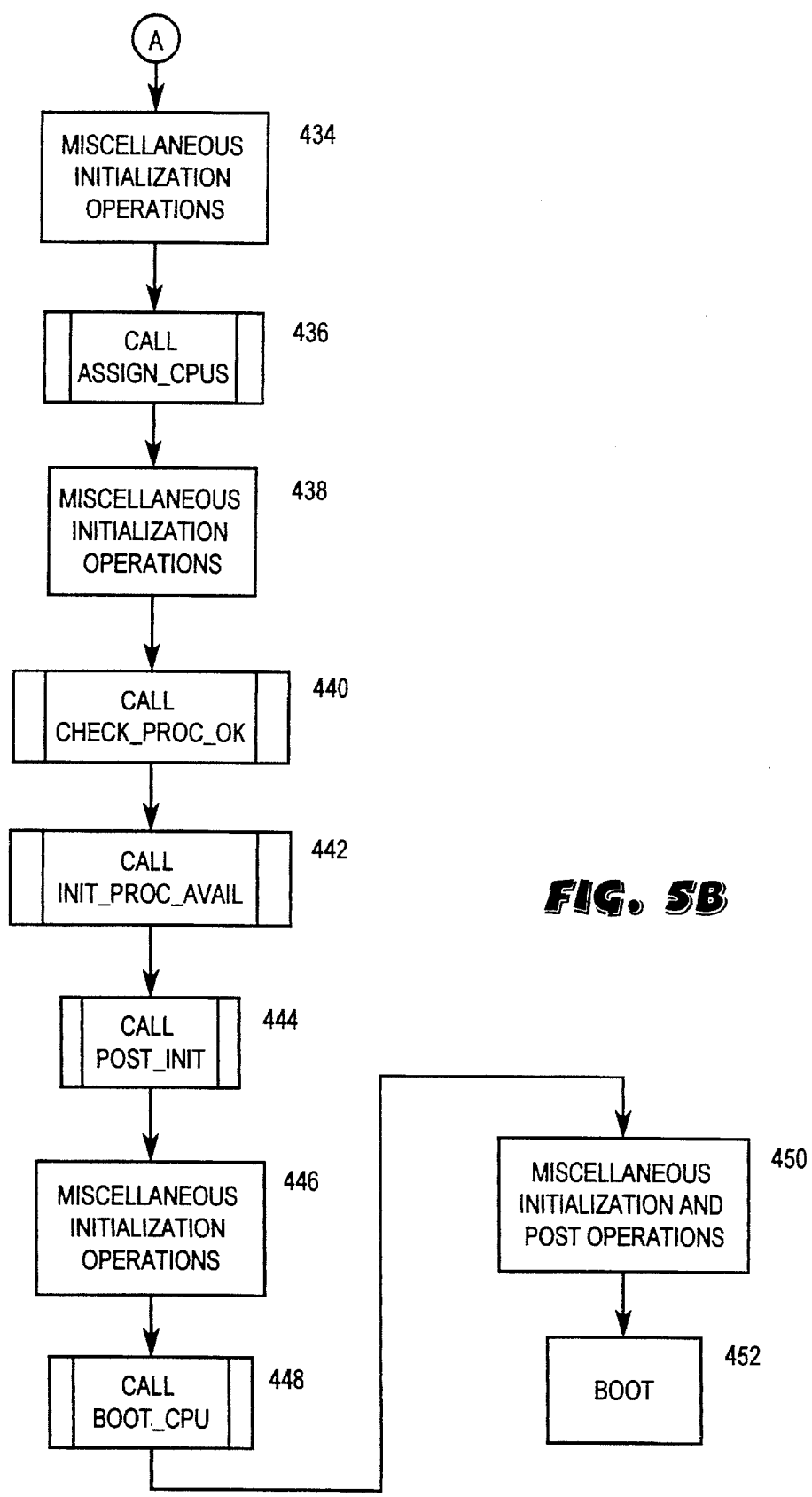
Figures 9, 10:
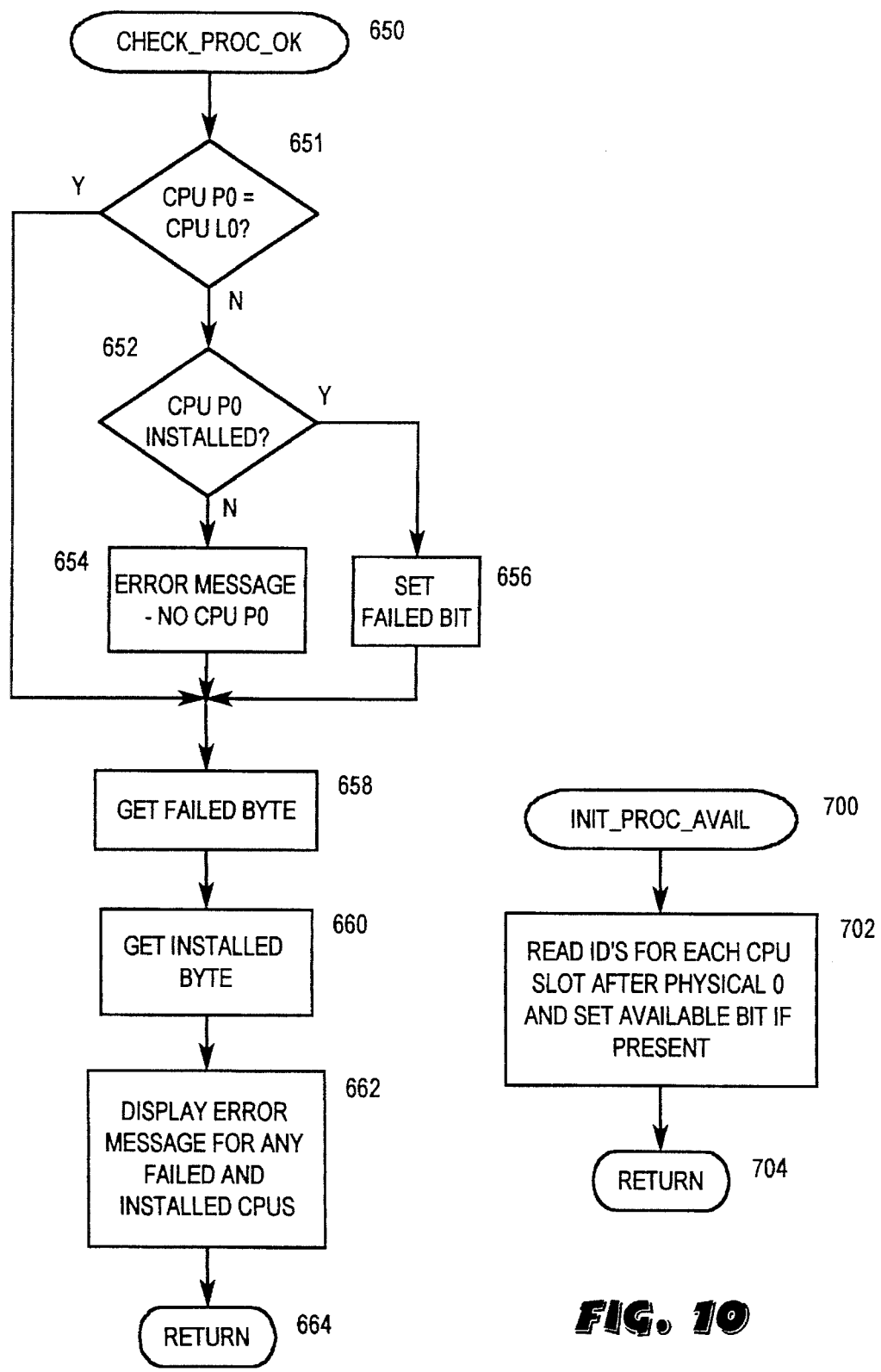
Figure 11:
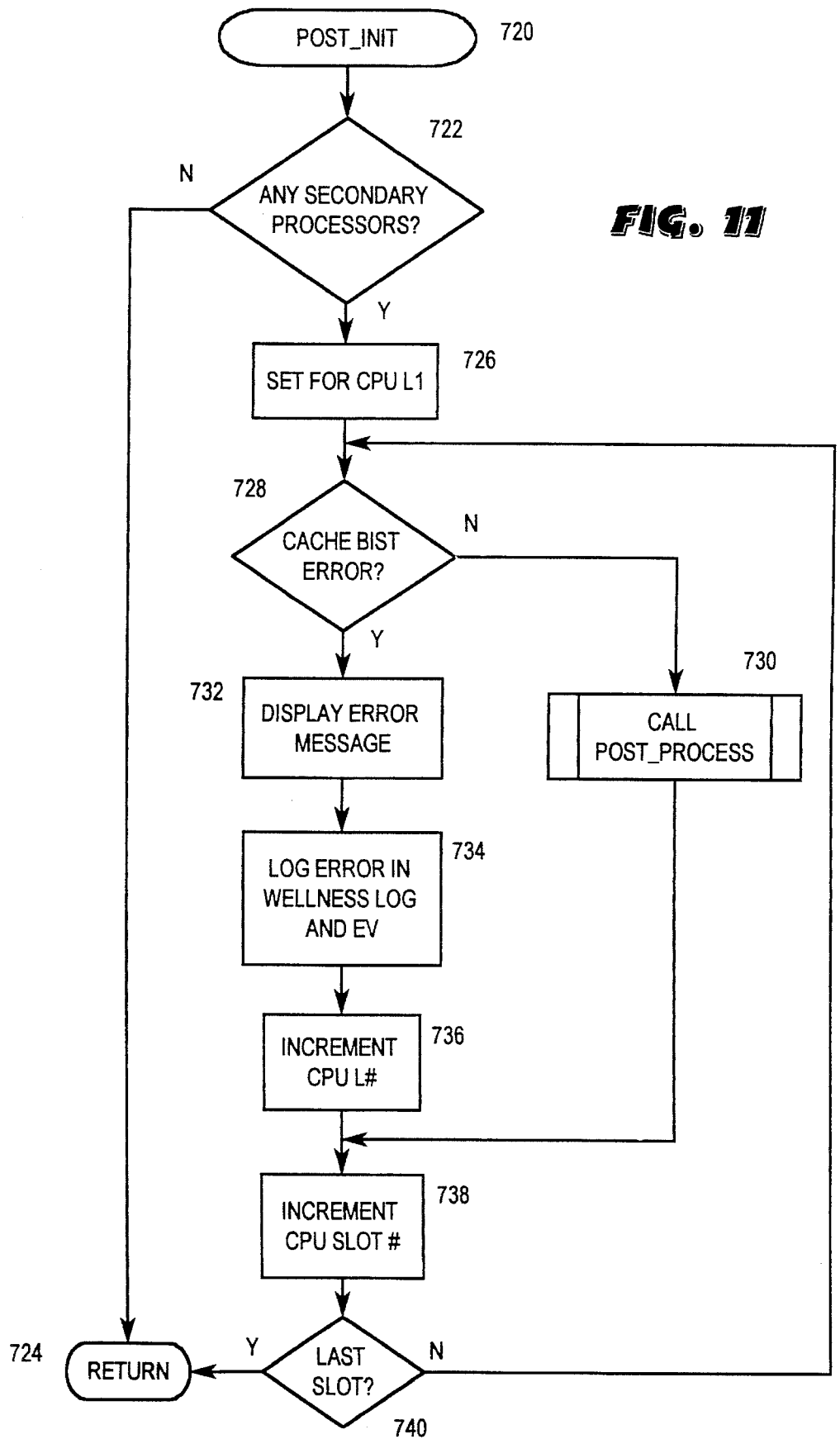
Figure 14:
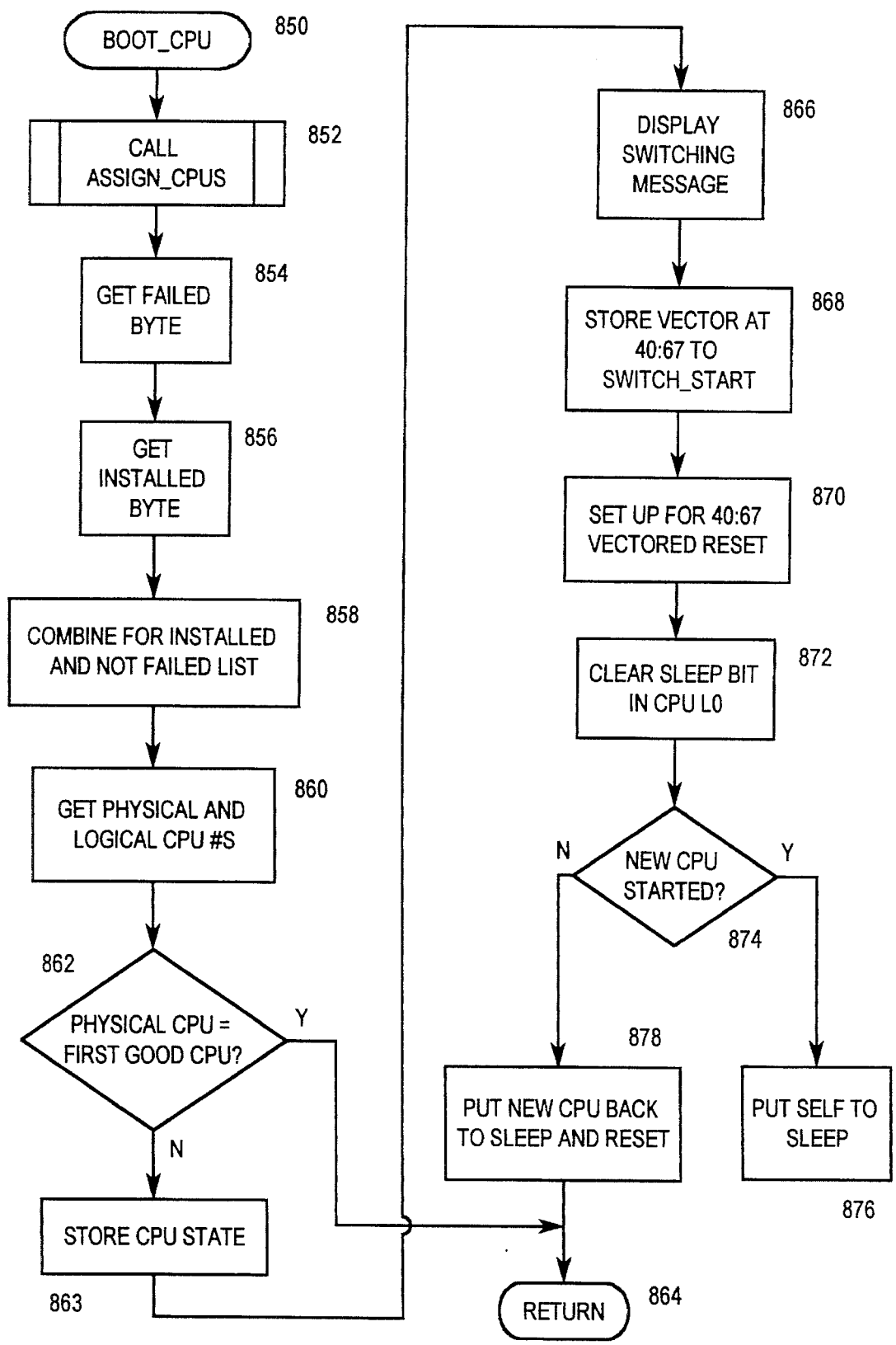

Control then proceeds to step 424 to determine if the checksum in the EEPROM 66 is okay. This is a check of the integrity of the EEPROM 66. If it checks okay, control proceeds to step 426 to determine if the 8042 keyboard controller 62 is okay. If not, control returns to step 402 and operations repeat. If the checksum did not validate in step 424, control proceeds to step 428 where an error is indicated by the appropriate number of beeps. If the keyboard controller 62 was okay in step 426 or after step 428, control proceeds to step 432 where values are written to ensure that all of the other CPUs in the system are asleep so that they do not interfere with the POST and booting process. Control then proceeds to step 434 (FIG. 5B) where miscellaneous initialization operations occur. After a number of these operations, control proceeds to step 436 where the call ASSIGN_CPUs sequence 600 (FIG. 8) is called. Control then proceeds to step 438, where more miscellaneous initialization operations occur. Control proceeds to step 440 where the CHECK_PROC_OK sequence 650 (FIG. 9) is called, which checks to see if any CPUs have failed and if so provides a message. Control then proceeds to step 442 where the INIT_PROC_AVAIL sequence 700 (FIG. 10) is called. This sequence 700 sets available bits in a stored flag byte for each of the CPUs after physical CPU0, as that is the one assumed to be operating. Control then proceeds to step 444, where the POST_INIT sequence 720 (FIG. 11) is called. This sequence 720 is used to start and initialize any secondary processors, which are processors other than CPU L0, in the system. Control then proceeds to step 446 where more miscellaneous initialization operations occur. Control proceeds to step 448 where the BOOT_CPU sequence 850 (FIG. 14) is called. This sequence 850 is used to check if the CPU currently executing has developed errors during the initialization operations and thus is sufficiently dependable to continue the boot process. Control proceeds to step 450 where miscellaneous initialization and POST or power-on self test operations occur. Ultimately control proceeds to step 452, which is the booting process of the computer system C.

It is noted that on the preferred microprocessors, step 422 will be executed in well less than the hardware CPU rotation time, but that any steps after step 422 are assumed to have occurred well after the rotation time. Particularly, step 448 will have occurred well after the rotation time.

The CHECK_WELL_PROCS sequence 500 (FIG. 6) commences operation at step 502 where a pointer is set to the beginning of the wellness log. Control proceeds to step 504 to get the wellness entry indicated by the pointer. In step 506 a determination is made whether the wellness entry indicates a cache parity error. If not, control proceeds to step 508 to determine if it indicates a CPU parity error. If not, control proceeds to step 510 to determine if the entry indicates that a processor POST error has occurred, that is an error during the POST procedure described below. If not, then none of these critical errors have occurred, and the particular CPU is considered sufficiently reliable to continue processing. Control proceeds to step 512, where the pointer value is incremented. At step 514 a determination is made whether the last entry in the wellness log has been checked. If not, control returns to step 504 and the next entry is obtained. If so, control proceeds to step 516, which is a return from the sequence 500.

If errors have been indicated in steps 506, 508 or 510, control proceeds to step 518 to determine the physical CPU number of the CPU indicating the failure. Control then proceeds to step 518 to determine if a failed flag is set for that particular CPU. Preferably this would have been set when the error occurred during normal operations when the wellness entries were actually made, but it could have occurred at other times as seen below. If the flag is not set, control proceeds to step 522 where it is set for that particular processor and control then proceeds to step 512. If the flag was already set, control proceeds from step 520 to step 512. Thus the sequence 500 scans the wellness log and indicates CPU failure for certain critical errors which have previously occurred.

The CHK_FAIL_PROCS sequence 550 commences at step 552 where a value indicating which CPUs are installed is obtained. This can be obtained by referencing a value contained in the CMOS memory or can be done by checking each processor slot. Control proceeds to step 554 where a value indicating the failed CPUs is obtained, such as the value developed in the CHECK_WELL_PROCS sequence 500. Preferably the installed and failed CPU values are contained in the environment variable area, with particular bits indicating particular processors. Control proceeds to step 556, where all of the failed CPUs are removed from the installed value. Control then proceeds to step 558 to determine if any CPUS are indicated as remaining. If not, control proceeds to step 560, which is a return from the sequence 550. If so, control proceeds to step 562 to determine if the current physical CPU is installed and has not failed. The current physical CPU is determined by doing a call to the appropriate location as described above and the failed flag is then compared. If it is installed and has not failed, this indicates that the CPU is considered sufficiently reliable and control proceeds to step 560.

If the failed flag is set, then the control essentially proceeds to a closed loop, commonly referred to as JMP $ instruction. This is quite proper in that the CHK_FAIL_PROCS sequence 550 is called from the COLD RESET sequence 400 well within the 2 second period used by the CPU rotation timer to indicate the need for the hardware to rotate the logical CPU value. Thus in this manner if the computer C goes through a cold reset, i.e. a power up condition, then its failed status of the booting processor is quickly determined and if certain critical errors have previously occurred, the CPU simply shuts down and the hardware proceeds to rotate the logical CPU number so that the booting process can continue. As discussed above, the reason for this rotation of the CPUs is that in many cases it may be possible for a processor to actually complete the entire POST and boot process before it fails. This is particularly true where parity error occurred as they are relatively infrequent and if they do occur, the consequences are relatively extreme. Thus it is considered that a CPU which has previously had a parity error in the processor itself or in the cache system is not sufficiently dependable over the long term to allow it to fully operate the computer C.

The ASSIGN_CPUS sequence 600 (FIG. 8) commences at step 602 where the installed CPUs are obtained. Control proceeds to step 604 where the list of failed CPUs is obtained. Control proceeds to step 606 to determine if there are any good CPUs. If not, an error flag is set in step 608 and control proceeds to step 610, which is a return from the sequence 600. If there are good CPUs, control proceeds from step 606 to step 612, where logical CPU numbers are assigned to nonfailed physical CPUs in physical order. Control then proceeds to step 610.

The CHK_PROC_OK sequence 650 (FIG. 9) commences at step 652 to determine if CPU P0 is equal to CPU L0. That is, is the physical 0 CPU also the logical CPU 0, indicating that it is apparently properly booting the system and has not previously failed. If not, control proceeds to step 651 to determine if CPU P0 is actually installed. If not, control proceeds to step 654 where a no CPU P0 error message is provided to the user. If it is installed, control proceeds to step 656 where the failed bit is set in the failed byte to indicate the CPU P0 has failed. If the CPU P0 is equal to CPU L0 in step 650 or after steps 654 and 656, control proceeds to step 658, where the failed byte is obtained. Control then proceeds to step 660 where the installed byte value is obtained. Control proceeds to step 662 where an error message is provided to the user to indicate any failed and installed CPUs. Control then proceeds to step 664, which is a return.

The INT_PROC_AVAIL sequence 700 (FIG. 10) has a step 702. In step 702, the computer system C reads the identifications for each CPU slot after physical 0, as physical 0 is assumed to be the one booting, and if there is a value, then a CPU is present and the available bit is set in the available byte. Control then proceeds to step 704 which is a return from the sequence.

Figure 12:
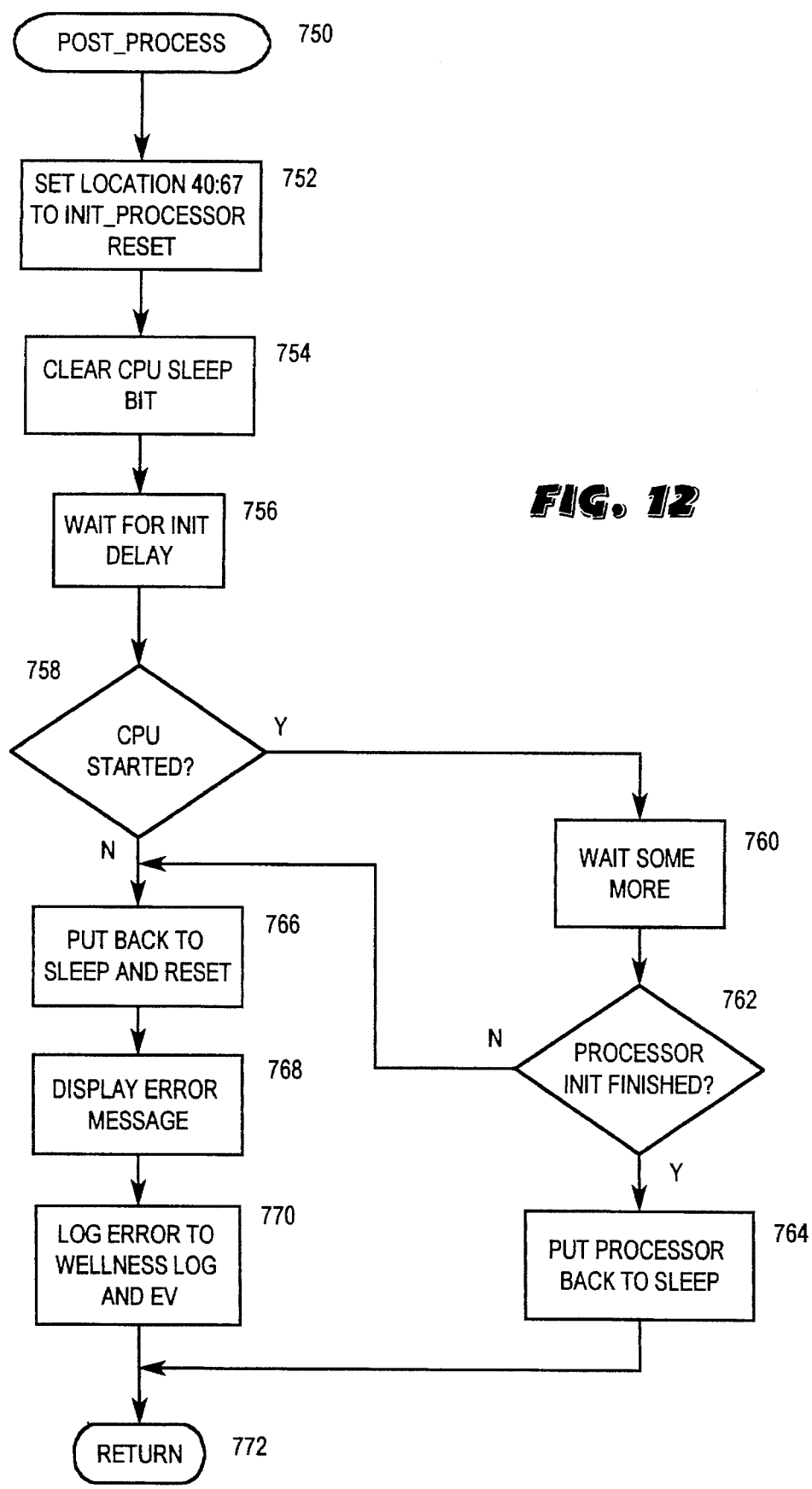

The POST_INT sequence 720 commences at step 722 to determine if there are any secondary processors. If not, control proceeds directly to step 724, which is a return, as there is nothing to initialize. If a secondary processor is present, control proceeds to step 726, where a pointer is set to indicate CPU L1. Control proceeds to step 728 to determine if the cache for that particular CPU had a BIST error. If not, control proceeds to step 730 where the POST_PROCESS sequence 750 (FIG. 12) is called. This sequence 750 initializes operation of the secondary processor. After step 730, control proceeds to step 738. If there was an error, control proceeds to step 732 where an error message is displayed. In step 734 the error is logged in both the wellness log and the environment variable. Control proceeds to step 736 where the logical CPU number is incremented. Control proceeds to step 738 where the physical CPU slot number is incremented. Control proceeds to step 740 to determine if this was the last slot. If not, control returns to step 728 where the process is repeated. If it was the last slot, control proceeds to step 724.

Figure 13:
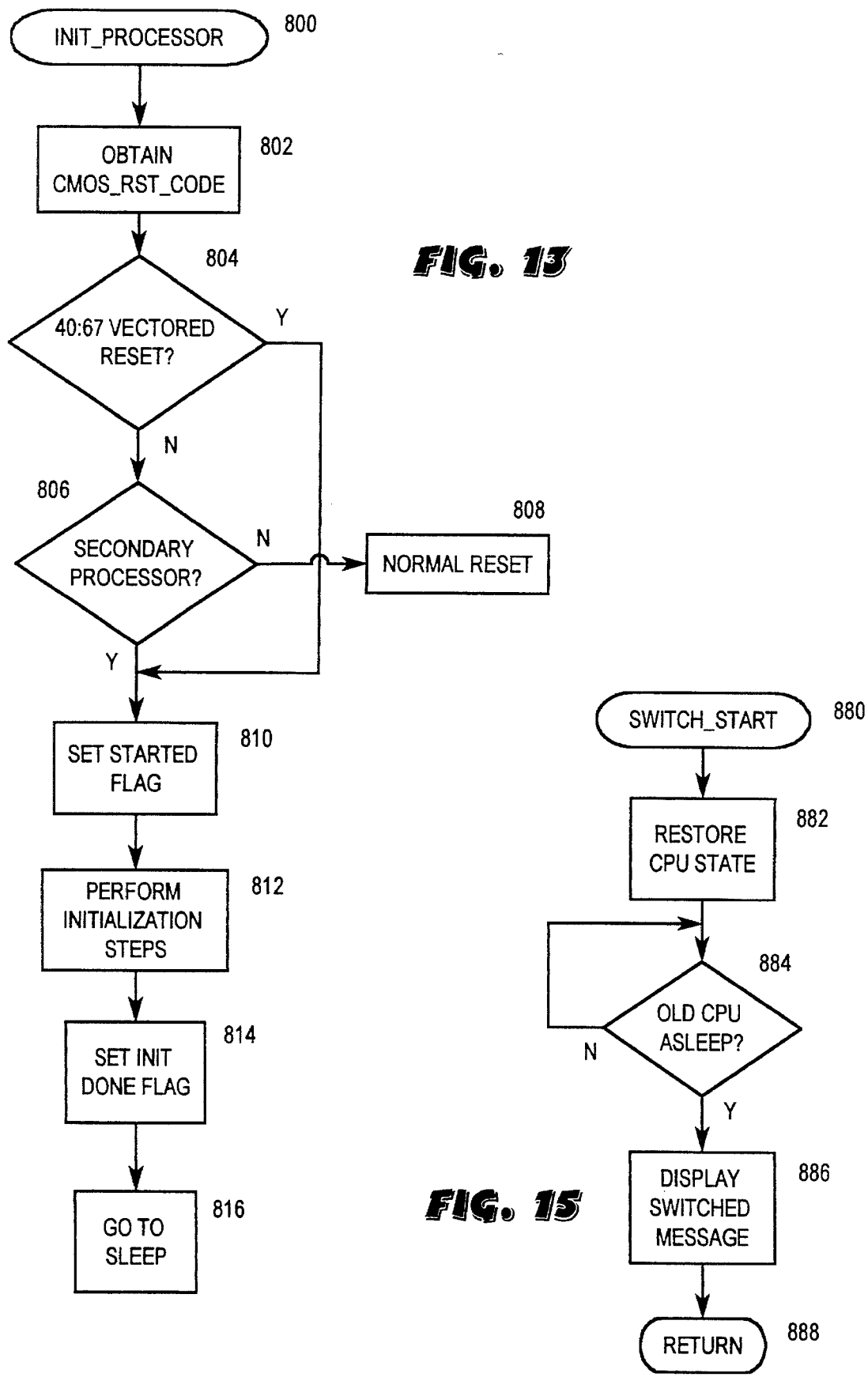

The POST_PROCESS sequence 750 commences at step 752, where a vector value is provided at the address 40:67h to a sequence called INIT_PROCESS or RESET 800 (FIG. 13). The 40:67h vector sequence is described in the referenced applications, but briefly is a location previously defined in IBM PC compatibles to receive a vector location used under certain conditions after a reset is issued to the processor. The original reason for this vector was to allow an 80286 processor to return from protected mode to real mode, but the vector location is now utilized for other operations. Control then proceeds to step 754 where the particular CPUs SLEEP bit is cleared. This will allow the CPU to begin operations. Control proceeds to step 756, where a period of time equal to an initialization delay is passed. This time period is provided to allow a certain period to have passed for the particular CPU to begin operations. Control proceeds to step 758 to determine if the CPU has indicated that it has started the initialization procedure. If so, control proceeds to step 760, where a further period of time elapses. Control proceeds to step 762 to determine if a flag has been set by the CPU which is initializing to indicate that the CPU in initialization operation has finished. If so, this is an indication the CPU has fully initialized, so control proceeds to step 764 where it is put back to sleep pending execution for further tasks.

If the CPU did not indicate START in the allotted time or it did not indicate finished in the allotted time, control proceeds from steps 758 and 762 to step 768, where the CPU is put back to sleep and a reset condition is indicated. Control proceeds to step 768, where an error message is displayed and then to step 770 where the error is logged in the wellness log and environment variable. Control then proceeds to step 772, which is a return from the sequence 750, which is also where execution proceeds after step 764.

The INIT_PROCESSOR_RESET sequence 800 commences at step 802, where the CMOS_RST_CODE value is obtained. As noted above, 40:67h is utilized for certain reset operations as a vector pointer. The way this is indicated is that a value contained in the CMOS memory portion of the RTC 64 is utilized to indicate the particular type of reset operation occurring. If a certain type is occurring, then a vector from 40:67h is executed, so that a more complete initialization and reset sequence is not executed. Control proceeds to step 804 to determine if the 40:67h vector reset is in effect. If not, control proceeds to step 806 to determine if this sequence 800 is being executed on a secondary processor. If not, control proceeds to step 808 which is the normal reset sequence. Effectively step 808 causes an entry into step 432 of the COLD RESET sequence 400. If vectored reset was indicated in step 804 or if this was a secondary processor in step 806, control proceeds to step 810, where the STARTED flag is set to inform the other CPU in step 758 that the CPU initialization operation has started. Control proceeds to step 812 where initialization steps occur. Control then proceeds to step 814 where the INIT_DONE flag is set to indicate to the other CPU that initialization has completed. Control then proceeds to step 816, where the CPU puts itself to sleep.

The BOOT_CPU sequence 850 commences at step 852, where the ASSIGN_CPUS sequence 300 is called. Control then proceeds to step 854 where the failed byte is obtained and to step 856, where the installed byte is obtained. Control proceeds to step 858, where the two values are combined to develop an installed and not failed list. Control then proceeds to step 860 where the physical and logical CPU numbers for the particular processor on which the sequence is operating are obtained. Control then proceeds to step 862 to determine if the physical CPU as indicated by step 860 is equal to the first good CPU as indicated in the combined installed and not failed value provided in step 858. If so, this is an indication that everything is satisfactory and control proceeds to step 864, which is a return from the sequence. If the physical CPU is not the first good CPU, this is an indication that an error has previously occurred on CPU P0 such that it can no longer be considered reliable. Then in step 863 the state of all the registers in the particular CPU are stored for later recall. Control then proceeds to step 866, where a message is displayed indicating control of the system is switching from one CPU to another active CPU in the system. Control then proceeds to step 868, where the vector pointing to the SWITCH_START sequence 880 (FIG. 15) is stored at 40:67h. Control proceeds to step 870 where operation is set up to perform a vectored reset from 40:67. This would include probably setting the CMOS values. Control proceeds to step 872, where the SLEEP bit in CPU L0 is cleared. By definition, this sequence can not be operating on CPU L0 as the ASSIGN_CPUS sequence 300 executed in step 852 would not have assigned a logical value to this particular CPU as it has been indicated as being failed. Thus by clearing the SLEEP bit in logic in CPU L0, the first active processor will actually have been activated. Control then proceeds to step 874 to determine if the new CPU has started operations by looking for the START flag. If so, control proceeds to step 876 where the CPU puts itself to sleep. If it has not started after a proper time, control proceeds to step 878 where the new CPU is put back to sleep and reset. Control then proceeds to step 864.

The SWITCH_START sequence 880 commences at step 882, where the CPU state which had been saved by the prior processor in step 864 is restored, so that effectively the new processor has the same state as the prior processor so operation can commence at effectively same point. Control proceeds to step 884 to determine if the old CPU is asleep yet. Control remains at step 884 until it has. Once it has gone to sleep, control proceeds to step 886, where a message is provided to indicate that the switch has occurred. Control then returns in step 888. A return is proper because by the state being restored, operation is able to be continued as though there was no processor switch. Effectively the return step 888 is the same as the return step 864 and returns operation to proceed at step 450. Thus in the BOOT_CPU sequence 850 the processors are rotated automatically based on the critical error log for errors which occurred during later initialization operations and had not occurred by the initial operations. The switch is done using the BOOT_CPU sequence 850 because step 448 occurs well after the preferred 2 second time for the hardware CPU rotation.

Therefore the computer system according to the preferred embodiment not only automatically rotates CPUs to the first fully operational CPU in case of major hardware failure of the boot processor but also transfers control should the processor have developed certain critical errors during its later operation such that it would be considered unreliable and undependable for long term operation. By this further improvement it is clear that the system will boot completely on only fully functional and dependable CPUs, thus reducing user aggravation and avoiding the potential loss of data.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A method for booting a multiprocessor computer system with a processor, comprising the steps of:
   maintaining a log of predetermined critical errors which have occurred on the computer system;
   resetting the computer system and beginning execution of initialization operations on a first processor of the multiprocessor computer system;
   determining if said first processor has previously had one of said predetermined critical errors; and
   if one of said predetermined critical errors had occurred, disabling said first processor and transferring execution to a second processor of the multiprocessor computer system to perform initialization operations.

2. The method of claim 1, further comprising the step of:
   transferring execution from the first processor to the second processor if the first processor has not performed a predetermined one of said initialization operations in a predetermined time, and
   wherein said step of determining if said first processor has previously had one of said predetermined critical errors occurs before said predetermined time, and
   wherein said step of disabling said first processor occurs before said predetermined time and includes halting operation of said first processor before performing said predetermined operation so that said step of transferring execution if the first processor has not performed said predetermined operation causes transfer of execution.

3. The method of claim 2, further comprising the steps of:
   if none of said predetermined critical errors had occurred, performing said predetermined operation;
   performing tests on said first processor after performing said predetermined operation and logging a critical error if one occurs;
   determining if one of said tests indicates one of said predetermined critical errors has occurred;
   if one of said predetermined critical errors has occurred, storing the processor state, activating said second processor and halting operation of said first processor; and
   restoring said stored processor state to said second processor and performing the remaining initialization operations on said second processor.

4. The method of claim 1, wherein said step of determining if said first processor has previously had one of said critical errors includes the steps of:
   performing tests on said first processor and logging a critical error if one occurs; and
   determining if one of said tests indicates one of said predetermined critical errors has occurred, and
   wherein said step of disabling said first processor includes the steps of:
      if one of said predetermined critical errors has occurred, storing the processor state, activating said second processor and halting operation of said first processor; and
      restoring said stored processor state to said second processor and performing the remaining initialization operations on said second processor.

5. A system for booting a multiprocessor computer system with a reliable processor, the system comprising:
   means for detecting and maintaining a log of predetermined critical errors which have occurred on the computer system; and
   means for initializing the computer system including:
      means for resetting the computer system and beginning execution of initialization operations on a first processor of the multiprocessor computer system;
      means for determining if said first processor has previously had one of said predetermined critical errors; and
      means for disabling said first processor and transferring execution to a second processor of the multiprocessor computer system to perform initialization operations if one of said predetermined critical errors had occurred to said first processor.

6. The system of claim 5, wherein said means for initializing the computer system further includes:
   means for transferring execution from the first designated processor to the second designated processor if the first designated processor has not performed a predetermined one of said initialization operations in a predetermined time; and
   wherein said means for determining operates before said predetermined operation is performed, and
   wherein said means for disabling halts operation of said first processor before said predetermined operation is performed.

7. The system of claim 6, wherein said means for initializing the computer system further includes:

means for performing tests on said first processor and logging a critical error in said log if one occurs;

means for determining if one of said tests indicates one of said predetermined critical errors has occurred;

means for storing the processor state of said first processor and halting operation of said first processor and for activating said second processor if one of said predetermined critical errors has occurred; and means for restoring said stored processor state to said second processor and performing the remaining initialization operations on said second processor.

8. The system of claim 5, wherein said means for determining further includes:

means for performing tests on said first processor and logging a critical error in said log if one occurs; and means for determining if one of said tests indicates one of said predetermined critical errors has occurred; and wherein said means for disabling further includes:

means for storing the processor state of said first processor, activating said second processor and halting operation of said first processor if one of said predetermined critical errors has occurred; and means for restoring said stored processor state to said second processor and performing the remaining initialization operations on said second processor.

* * * * *

UNITED STATES PATENT AND TRADEMARK OFFICE
CERTIFICATE OF CORRECTION

PATENT NO. : 5,491,788
DATED : February 13, 1996
INVENTOR(S) : Darren J. Cepulis et al.

It is certified that error appears in the above-identified patent and that said Letters Patent is hereby corrected as shown below:

Title page,
Item [54], Title, delete "TRANSFERRING" and insert therefor -- TRANSFERRED --.

Column 3,
Line 27, delete "CPU" and insert therefor -- CPU; --.
Line 27, the sentence starting with "FIG. 5A," should start a new paragraph.

Column 14,
Line 39, before "processor," delete "reliable".

Signed and Sealed this

Twenty-ninth Day of November, 2005

JON W. DUDAS
*Director of the United States Patent and Trademark Office*